United States Patent
Sprunk et al.

(10) Patent No.: US 8,761,401 B2
(45) Date of Patent: Jun. 24, 2014

(54) SYSTEM AND METHOD FOR SECURE KEY DISTRIBUTION TO MANUFACTURED PRODUCTS

(75) Inventors: Eric J. Sprunk, Carlsbad, CA (US); Alexander Medvinsky, San Diego, CA (US); Xin Qiu, San Diego, CA (US); Stuart Moskovics, San Diego, CA (US); Liqiang Chen, San Diego, CA (US)

(73) Assignee: Motorola Mobility LLC, Chicago, IL (US)

( * ) Notice: Subject to any disclaimer, the term of this patent is extended or adjusted under 35 U.S.C. 154(b) by 1437 days.

(21) Appl. No.: 11/846,045

(22) Filed: Aug. 28, 2007

(65) Prior Publication Data

US 2008/0049942 A1  Feb. 28, 2008

Related U.S. Application Data

(60) Provisional application No. 60/823,738, filed on Aug. 28, 2006.

(51) Int. Cl.
*H04L 9/08* (2006.01)
*H04L 9/00* (2006.01)
*H04L 9/32* (2006.01)

(52) U.S. Cl.
USPC ............ 380/278; 380/279; 380/283; 380/44; 713/171

(58) Field of Classification Search
USPC ............... 380/283, 278, 279, 44; 713/171
See application file for complete search history.

(56) References Cited

U.S. PATENT DOCUMENTS 7,054,447 B1 * 5/2006 Price, III ................. 380/278
2006/0236111 A1 * 10/2006 Bodensjo et al. ........... 713/176

* cited by examiner

*Primary Examiner* — Aravind Moorthy

(57) ABSTRACT

A system and method for securely distributing PKI data, such as one or more private keys or other confidential digital information, from a PKI data generation facility to a product in a product personalization facility that is not connected to the PKI data generation facility and is assumed to be a non-secure product personalization facility. The system includes a PKI data loader for securely transmitting the encrypted PKI data transferred from the PKI data generator to a PKI server at the product personalization facility. The PKI server then transfers the PKI data to the product of interest, typically via a PKI station acting as a proxy between the PKI server and the product. In each communication step, PKI data being transferred is encrypted multiple times and the system is designed such that if any intermediate node is compromised with all of its keys, the overall system has not yet been compromised.

20 Claims, 5 Drawing Sheets

SYSTEM AND METHOD FOR SECURE KEY DISTRIBUTION TO MANUFACTURED PRODUCTS

CROSS-REFERENCE TO RELATED APPLICATION

This application claims priority to the filing date of a U.S. provisional patent application having Ser. No. 60/823,738, entitled "Method And Apparatus For Public Key Distribution", filed on Aug. 28, 2006, which is incorporated herein by reference in its entirety.

BACKGROUND OF THE INVENTION

1. Field of the Invention

The invention relates to key distribution. More particularly, the invention relates to improved systems and methods for distributing key data from a key generation facility to products within a product personalization facility.

2. Description of the Related Art

Systems and methods for transferring or delivering digital information to various end user devices and/or products often involve some sort of digital rights management (DRM) format or scheme that usually includes encrypting the content to be transferred and providing one or more decryption keys to authorized users or user devices for decrypting the encrypted content. One type of encryption scheme is public key encryption, which involves a public key and a corresponding private key. The public key may be widely published or distributed across a communications network, while the corresponding private key is held by the authorized end user device or product. In public key encryption, information encrypted with a public key can be decrypted only with the corresponding private key.

In systems that use public key encryption, one concern is determining whether a public key is authentic, i.e., verifying that a received public key has not been copied, replaced or otherwise compromised. One manner to address this concern is through the use of a public key infrastructure (PKI), which generally is a collection of servers and software that enables an organization, company, or enterprise to distribute and manage the distribution of public and private keys from a key generation facility to products generated at a product personalization facility in a manner that allows users to reliably determine the identity of the owner of each public/private key pair. The PKI often uses a third party certificate authority (CA) to bind public keys with respective end users or end user products using public key certificates. In this manner, the certificate authority can reliably identify the owner of each public/private key pair.

During the manufacture of products or devices that will use public key encryption and/or digital signatures, various PKI information or data, such as one or more private keys, often must be loaded onto the products before the products leave the product personalization facility. Much of such PKI information is generated at a key generation facility, which typically is a third party facility not associated with the product personalization facility. For example, the key generation facility also can be the certificate authority.

Typically, it is assumed that the product personalization facility is a secure environment, and the distribution of PKI data to products within the product personalization facility will not be compromised. However, if the product personalization facility is not a secure or trusted environment, PKI data distributed to the product personalization facility for loading onto products can be compromised in a manner that will allow later unauthorized access to products manufactured at the product personalization facility. It may also be possible to steal the private keys in the personalization facility and then later install them into unauthorized devices from a different manufacturer, into personal computers, or into unauthorized systems not intended to hold those private keys. If the private keys are stolen, the same private key and digital certificate can be loaded into many unauthorized devices, thus creating clones that all pretend to have the same identity and can all make use of pay services under a single subscription.

Accordingly, there is a need for a secure system and method for distributing PKI data and other encryption/decryption information from a facility that generates the PKI data to the product personalization facility and the products manufactured therein.

DETAILED DESCRIPTION

Figure 1:
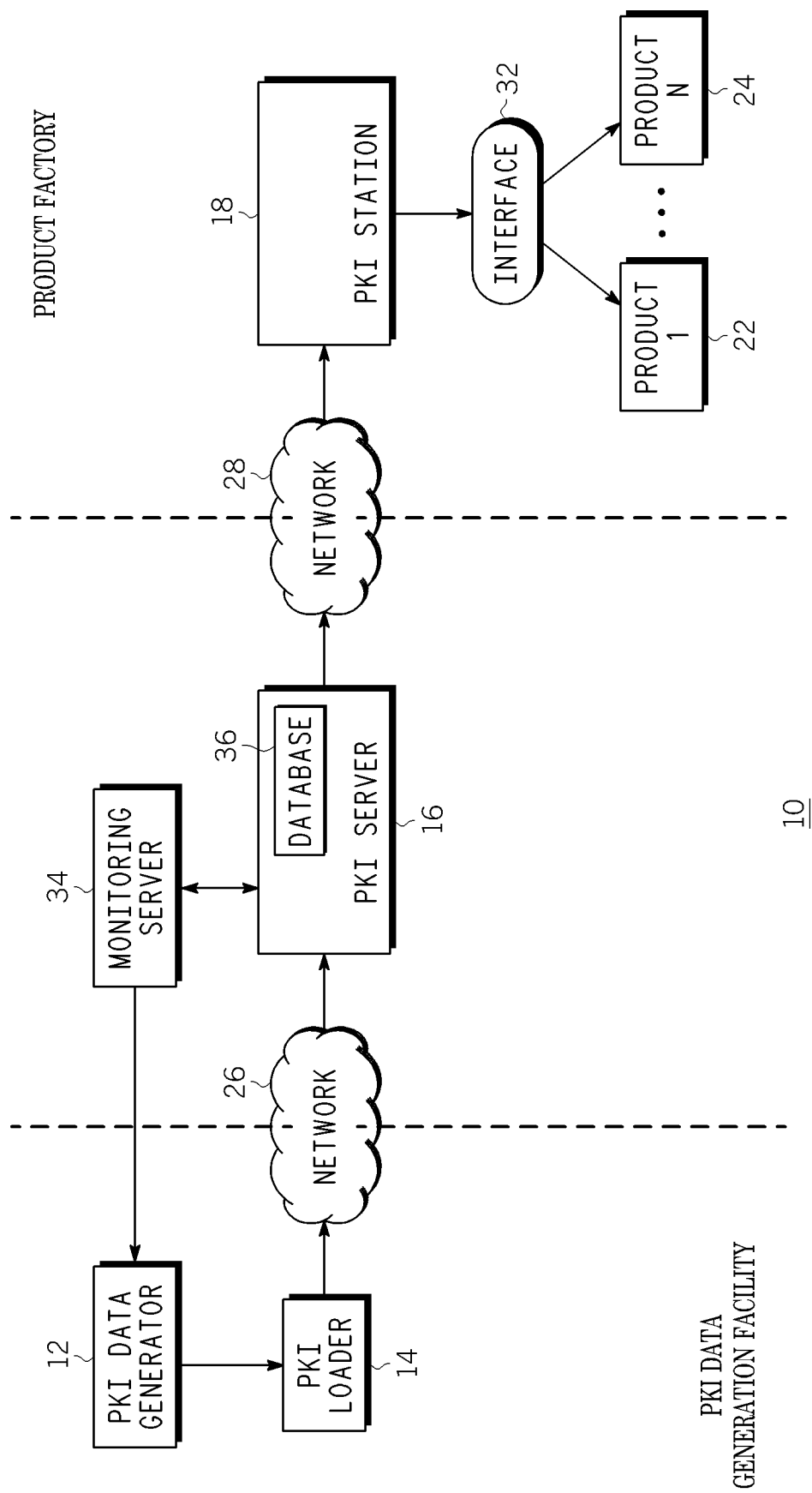
FIG. 1 is a block diagram of a public key infrastructure (PKI) distribution system according to embodiments of the invention.

In the following description, like reference numerals indicate like components to enhance the understanding of the PKI data distribution systems and methods through the description of the drawings. Also, although specific features, configurations and arrangements are discussed herein below, it should be understood that such specificity is for illustrative purposes only. A person skilled in the relevant art will recognize that other steps, configurations and arrangements are useful without departing from the spirit and scope of the invention.

The systems and methods described herein involve securely distributing PKI data from a PKI data generation facility to a product personalization facility for loading onto products or devices manufactured in the product personalization facility. The product personalization facility, which is not connected to or part of the PKI data generation facility, is not assumed to be a secure environment. The PKI data generating facility includes a PKI data generator and a PKI data loader coupled to the PKI data generator. The system also can include a PKI server coupled to the PKI loader via one or more networks. The PKI server also is coupled to the product personalization facility via one more networks. The product personalization facility includes a PKI station, which typically is located at the production line of the product personalization facility, and which is coupled to one or more of the manufactured products or devices. The PKI data distribution method includes encrypting the generated PKI data with one or more encryption layers for securely transmitting the PKI data from the data generation facility to the product personalization facility and onto the product of interest. For example, the data generation facility can encrypt the confidential portion of the generated PKI data with two or more encryption layers and transmit the encrypted PKI data preferably using a secure tunnel. The secure tunnel may be used to provide authentication in one or both directions and may optionally include another layer of encryption used only during the transport of the data.

When the PKI server is preparing to forward the PKI data to the PKI station, the PKI server can remove the outer encryption layer (using a key it shares with the data generation facility), and re-encrypt the PKI data using one of its own encryption layers. The PKI server also can transmit the encrypted PKI data via a secure tunnel to the PKI station. The secure tunnel between the PKI server and the PKI station optionally provides authentication in one or both directions and may optionally include another layer of encryption on this interface. The PKI station can remove the optional encryption that may be provided by the secure tunnel. Any additional layers of encryption outside of the secure tunnel can only be removed by the manufactured product. The resulting encrypted PKI data can be loaded onto the product of interest. The product can validate and further decrypt the PKI data loaded thereon. The product also can store therein the decrypted PKI data. Preferably, the product uses a secure or encrypted storage area for confidential parameters. Also, a monitoring server can be used to monitor the PKI inventory on the PKI server.

Referring to FIG. 1, shown is a block diagram of a public key infrastructure (PKI) distribution system 10 according to embodiments of the invention. The system 10 includes a PKI data generation facility that includes a PKI data generator 12 and a PKI download server or loader 14. The system 10 also includes a PKI server (PKIS) 16, a PKI station or product interface infrastructure 18, and a product personalization facility that manufactures one or more products or product devices 22, 24 that use PKI data and/or other PKI information.

For purposes of discussion herein, the term "PKI data" refers to one or more of digital certificates, public keys and other confidential information that is loaded into manufactured devices, such as symmetric cryptographic keys, private keys, passwords and other secret values.

As will be discussed in greater detail hereinbelow, the PKI loader 14 can be coupled to the PKI server 16 via one or more networks 26. Also, the PKI server 16 can be coupled to the PKI station 18 via one or more networks 28. The PKI station 18 typically is coupled to one or more products 22, 24 via a product-specific interface 32, which preferably is not a network. Before the PKI data has been loaded onto the product, the product does not yet have any cryptographic identity and cannot authenticate itself directly. Therefore, it is more secure to connect to the product via a non-networked interface that does not permit additional and possibly unauthorized devices or computers to be attached to that network. The system 10 also can include a monitoring server 34 coupled between the PKI server 16 and the PKI data generator 12 for monitoring the status of the PKI server 16.

PKI data generated by the PKI data generator 12 is preferably transported to the PKI loader 14 using a secure interface that prevents hackers from somehow breaking through a firewall and obtaining unauthorized access to a PKI data generator. Alternatively, the PKI data generator 12 is able to securely transport PKI data directly to a PKI server. The PKI data generator 12 can include one or more appropriate components for generating PKI keys, such as private keys and public keys, digital certificates and/or other PKI data and information used by products. For example, the PKI data generator 12 can be or include a hardware or hardware security module (HSM). Also, the PKI data generator 12 can include or be part of a certificate authority (CA). The PKI data generated by the PKI data generator 12 typically is encrypted using two layers of encryption before the generated PKI data is transmitted from the PKI data generator 12 to the PKI loader 14.

The PKI loader 14 sends the PKI data to the PKI server 16, e.g., via the network 26. Alternatively, the logical function of the PKI server 16 can be merged into the PKI station 18 and the PKI loader 14 can then connect to the PKI station 18, e.g., via one or more of the network 26 and/or the network 28. The PKI server 16 includes a database 36 that stores a relatively large amount of PKI data. During the personalization of a specific manufactured product, the PKI server 16 delivers, on demand, a unique and previously unused set of PKI data to the PKI station 18, e.g., via the network 28. The PKI server 16 retains a relatively large supply of PKI data in its database and thus guards against network connectivity interruptions between the PKI loader 14 and the PKI station 18.

The PKI station 18 forwards PKI data to one or more of the products 22, 24, e.g., via the product-specific interface 32. The PKI station 18 also is configured to bridge between the standardized output interface of the PKI server 16 and the variable, possibly non-standard input interface of one or more of the products 22, 24. The products 22, 24 can be any suitable device that uses keys and/or other PKI data or information for some purpose, e.g., digital rights management (DRM). For example, one or more of the products 22, 24 can include but is not limited to a digital video recorder (DVR) or digital video server (DVS) device, including any signal converter or decoder (set-top) box with internal and/or external recording capabilities and local and/or remote storage, which often are referred to as personal video recorder (PVR) devices. Other suitable manufactured products a digital video disk recorder, a computer, a television, and any suitable mobile end user communication device, such as a cellular telephone, a smartphone, a personal digital assistant (PDA) device or other wireless handheld device, a digital camera, a laptop personal computer (PC) or a notebook PC.

The network 26 can be any private network or network server arrangement suitable for coupling directly or indirectly between the PKI loader 14 and the PKI server 16. The network 28 can be any private communication network or network server arrangement suitable for coupling directly or indirectly between the PKI server 16 and the PKI station 18. For example, all or a portion of the network 26 and/or the network 28 can be an Internet virtual private network (VPN) or other suitable private Internet protocol (IP) based network, computer network, web-based network or other suitable wired or wireless private network system. The product-specific interface 32 preferably is a local non-networked interface, such as a serial connection or a non-networked Ethernet connection with a cross-over cable, suitable for coupling directly or indirectly between the PKI station 18 and one or more products 22, 24 manufactured at the product personalization facility.

The system 10 includes one or more layers of encryption for transmitting PKI data from the PKI data generation facility to the product personalization facility and the products 22, 24 manufactured therein. For example, as discussed hereinabove, the PKI data generator 12 encrypts PKI data end-to-end generated therein using a secret inner-layer key that is pre-shared with the manufactured products and can only be removed by the manufactured product itself. The term "end-to-end" indicates that any intermediate servers (e.g., PKI servers) do not have access to this key pre-shared with the manufactured product. Also, PKI server (PKIS)-specific encryption can be used in addition to the end-to-end encryption, e.g., for PKI data being delivered from the PKI data generator 12 to the PKI loader 14. Such encryption is referred to herein as PKIS-specific encryption to reflect both types of encryption being used.

On top of the inner-layer key and the PKIS-specific encryption, a secure tunnel can be applied to the PKI data transmitted from the PKI loader 14 to the PKI server 16. This secure tunnel is used to authenticate the identities of the PKI loader and/or the PKI server and could optionally add another layer of encryption. This secure tunnel guards against illicit loading of data to the PKI server 16 or spoofing output status data of the PKI server 16, such as data involving the inventory of stored keys and/or other PKI data on the PKI server 16. Standard protocols such as Secure Socket Layer (SSL), Transport Layer Security (TLS) or Internet Protocol security (IPsec) can be used for this purpose. This secure tunnel is referred to herein as the PKI loader secure tunnel. The PKI server 16 also can make use of an authenticated key agreement to create a one-time shared session key, e.g., for one set of PKI data transmitted from the PKI server 16 to the manufactured product via the PKI station 18. For example, the authenticated key agreement protocol may be Diffie-Hellman (DH) signed using the Rivest Shamir Adleman (RSA) algorithm, RSA-based key agreement or Elliptic Curve Diffie-Hellman (ECDH) signed using the Elliptic Curve Digital Signature Algorithm (ECDSA). The PKI station itself does not participate in the authenticated key agreement. Because the PKI station is product-specific, it is typically designed and developed using personalization facility staff or other personnel without expertise in security. Therefore, the PKI station is less trusted than the PKI server, and therefore acts only as a proxy. The PKI station is not trusted to participate in the authenticated key agreement.

The authenticated key agreement consists of the PKI server and the product generating random public/private key pairs and exchanging their key agreement public keys. Each side uses its key agreement private key and the other side's key agreement public key to come up with a shared key can be referred to as the PKIS session key.

The PKI server 16 typically removes the PKIS-specific encryption layer (i.e., decrypts the PKIS-specific encryption layer with a PKIS-specific database key) from a set of PKI data retrieved from its database before the authenticated key agreement takes place and PKIS session key encryption layer is added. The PKIS-specific database key is preferably protected by an HSM on the PKIS. Therefore, the resulting encryption is referred to herein as PKIS session key encryption. A PKIS secure tunnel may be added on top of the PKIS session key-encrypted PKI data, e.g., before passing the PKI data from the PKI server 16 to the PKI station 18. The PKIS secure tunnel is used to authenticate the identities of the PKI server and/or the PKI station, and optionally adds another layer of encryption. For example, a standard protocol, such as SSL, TLS or IPsec may be used to implement the PKIS secure tunnel.

As mentioned previously, the PKI station is less trustworthy than the PKI server. Therefore, preferably, the private key of the PKI station that is used in the setup of this secure tunnel is protected within a Hardware Security Module (HSM), which is a tamperproof device, such as a USB token or a PCI card, installed in the PKI station.

The PKI station 18 typically removes the SSL encryption layer and passes PKI data to the manufactured product using PKIS session key encryption. The product removes the PKIS session key encryption layer, leaving the end-to-end encryption originally added by the PKI data generator 12. In addition to the encryption layers discussed, the network 26 and/or the network 28 may provide other additional encryption layers.

Also, the product-specific interface 32 may provide its own interface-specific encryption layer in addition to the PKIS session key encryption.

The PKIS secure tunnel used for PKI data transfer between the PKI server 16 and the PKI station 18 also is used by the PKI server to limit access to PKI data only to a specific list of PKI stations. Such list is called an Access Control List (ACL). That is, the PKI server securely obtains the identity of the PKI station during the secure tunnel establishment and then checks that this specific identity corresponds to an authorized PKI station that is in the ACL. For example, the identity of the PKI station may be an IP address and it may be securely obtained from a digital certificate of the PKI station.

The PKIS-specific encryption used for PKI data transfer between the PKI data generator 12 and the PKI server 16, e.g., via the PKI loader 14, is used to assure that keys and other PKI information intended for a specific PKI server 16 can be used only on the specific target PKI server 16. In this manner, the PKIS-specific encryption prevents any misrouting of PKI data from the PKI loader 14 to an incorrect PKI server 16. In the interface between the PKI loader and the PKI server, optionally the PKI loader can query from the PKI server the identity of its PKIS-specific encryption key. This identity can be for example the hash of the PKIS-specific encryption key. By checking the identity of the PKIS-specific encryption key ahead of time, the PKI loader avoids loading incorrectly encrypted data to a PKI server that it later cannot use. Also, the PKIS session key encryption used for PKI data transfer between the PKI server 16 and one or more of the products 22, 24 is used to guard against message replay between the PKI server 16 and the products 22, 24, even though the products 22, 24 do not yet have a cryptographic identity to use with conventional classic authentication.

The end-to-end encryption used for PKI data transfer between the PKI data generator 12 and the products 22, 24 is used to assure that only the intended product 22, 24 of a specific model can decrypt the keys and/or other PKI data intended for it. If the encryption used is asymmetric, i.e., where a different key is used for encryption than decryption and only the decryption key resides in the product of interest (e.g., public/private key cryptography), the encryption also assures that no data illicitly extracted from the product of interest will allow a non-authorized user to encrypt data for that family of products. Typically, there is only one end-to-end encryption key and one end-to-end decryption key for one family of products, such as a specific device model. Even within the same product, different keys that are used by different hardware or software modules may be encrypted using a different end-to-end key.

In operation, generally, within the system 10, the PKI server 16 retrieves personalization data and/or other PKI data for one of the products 22, 24 and then forwards the PKI data as a single message to the appropriate product 22, via the PKI station 18. The PKI data is retrieved from a local store on the PKIS platform, such as the database 36. The database 36 is replenished periodically with newly-created PKI data from the PKI data generator 12. Typically, the system 10 includes two or more server-class platforms independently running PKIS software, with each server-class platform including an independent PKI database. Also, each server-class platform can be configured with an HSM (Hardware Security Module), which holds the PKIS-specific decryption key as well as a private key used in the authenticated key agreement. The HSM itself is tamper-resistant and without it, the PKI server does not have the necessary keys to remove the PKIS-specific encryption layer or to participate in the authenticated key agreement with the manufactured product.

The PKI server 16 is configured to apply to and be compatible with many different types of products or devices that require personalization of unique PKI data in the product personalization facility or in other product locations, such as a distribution center or a service depot. The PKI server 16 has a standardized interface to all PKI stations that do not depend on the manufactured product's model or on the type of PKI data being provisioned. In general, the PKI station 18 is a proxy coupled between the PKI server 16 and a product that is being personalized, e.g., the product 22. To implement a PKIS client inside a particular product, i.e., to load PKI data onto the particular product, the format of the PKI data for that particular type of device needs to be specified. Typically, there is a separate specification available for each type of PKI data that is supported by the PKI server 16.

During data delivery from the PKI server 16 to the PKI station 18, the PKI station 18 issues a request for configuration data using data received from the particular product of interest. The configuration data typically includes the product device serial number and the device's key agreement public key. For example, if the key agreement protocol is Diffie-Hellman, the public key is $g^y$ mod p. The PKI station 18 formats this data appropriately for transmission to the PKI server 16. The connection between the PKI station 18 and the particular product or device being personalized varies depending on the particular type of device. For example, for mobile handset products or devices, the connection typically will be a serial interface, such as an RS232 interface or a USB (Universal Serial Bus) interface.

Figure 2:
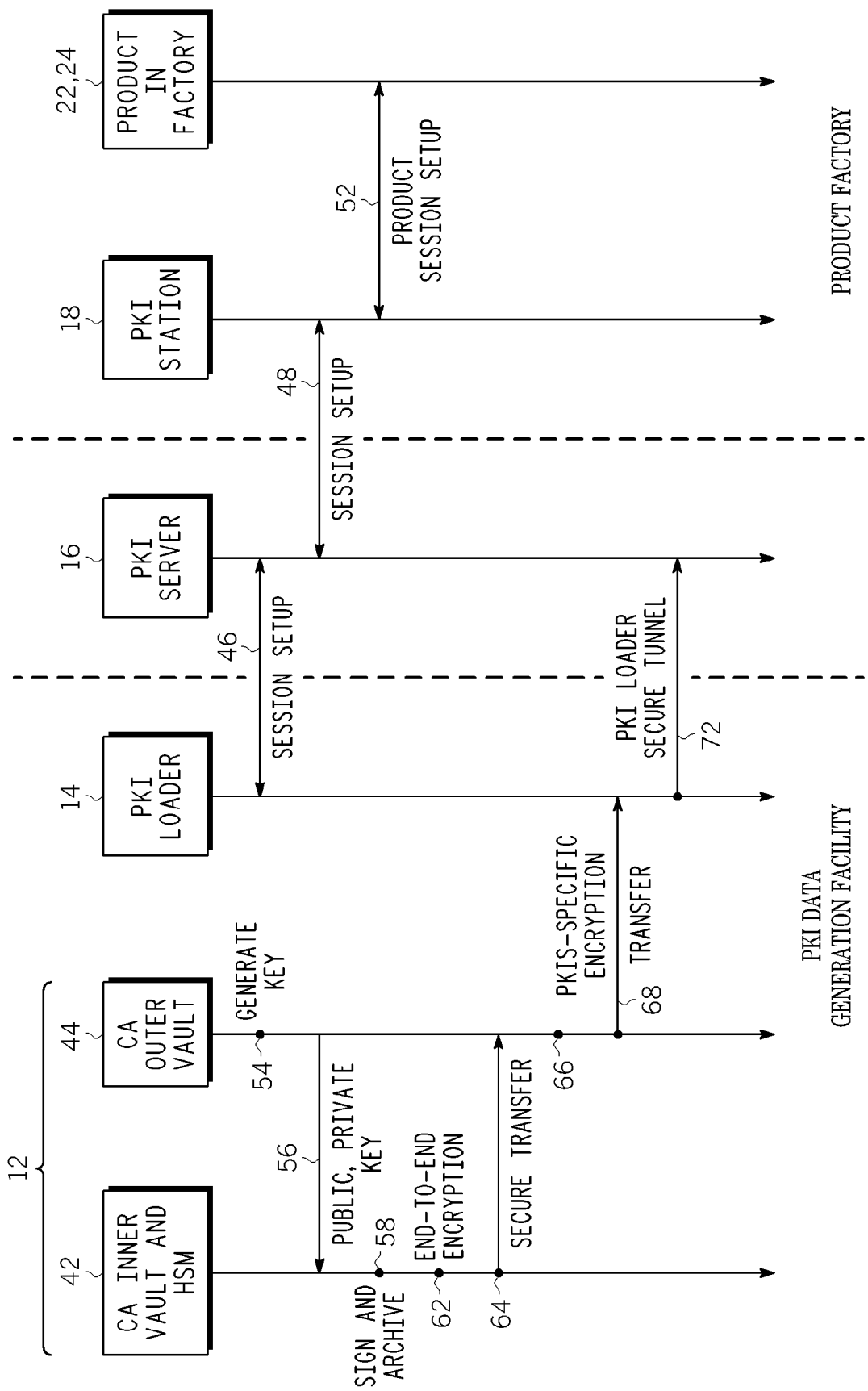
FIG. 2 is a block diagram illustrating data flow within the PKI distribution system of FIG. 1.

Referring now to FIG. 2, with continuing reference to FIG. 1, shown is a block diagram 50 illustrating data flow within the PKI distribution system 10. FIG. 2 shows the data flow of a private key and other appropriate PKI data between the PKI data generator 12 and the products 22, 24 using one or more of the encryption layers. As shown in FIG. 2, the PKI data generator 12 includes a first portion 42 that includes a certificate authority inner vault and the host security module (HSM), and a second portion 44 that includes a certificate authority outer vault. The PKI data or key generation facility that includes the PKI data generator 12 also includes the PKI loader 14, although the PKI loader 14 typically is located in a less secure area of the facility than the area of the PKI data generator 12.

Initially, it is assumed that various sessions between various system components have been set up. For example, it is assumed that an SQL/SSL (Structured Query Language/Secure Sockets Layer) session setup or other appropriate session setup has been established between the PKI loader 14 and the PKI server 16. This session corresponds to the PKI Loader secure tunnel described earlier. Such session setup is shown generally as a first session setup 46. Also, it is assumed that an SSL session setup or other appropriate session setup has been established between the PKI server 16 and the PKI station 18. This session corresponds to the PKI server secure tunnel already described. Such session setup is shown generally as a second session setup 48. Also, it is assumed that a product session setup has been established between the PKI station 18 and the product of interest, such as the product 22 or the product 24. The product session setup is shown generally as a product session setup 52.

The first data activity in the data flow diagram is the generation of a private key or other appropriate PKI data. The private key generation is generated within the CA outer vault 44, and is shown generally as key generation 54. Next, the CA outer vault 44 transfers the generated private key with its corresponding public key to the CA inner vault 42. Such transfer is shown generally as key transfer 56. Upon receipt of the public/private key pair, the inner vault 42 signs the public key using a CA private key inside the HSM, and optionally archives the received public/private key pair. Such is shown generally as sign and archive 58.

The inner vault 42 then encrypts the private key using an end-to-end encryption key, e.g., using HSM-based RSA encryption of a random advanced encryption standard (AES) key generated only for one set of PKI data and then subsequent AES encryption of the private key. Such encryption is shown generally as end-to-end encryption 62. The encrypted private key then is loaded or securely transferred to the outer vault 44 via a secure network therebetween. The secure transfer is shown as secure transfer 64.

Next, the outer vault 44 encrypts the end-to-end-encrypted private key with PKIS-specific encryption, resulting in two layers of encryption for the private key. Such encryption is shown generally as PKIS-specific encryption 66. The PKIS-encrypted private key then is moved from the outer vault portion of the PKI data generator 12 to the PKI loader 14. Such transfer is shown as transfer 68.

The PKIS-encrypted private key then is transferred from the PKI loader 14 to the PKI server 16 using a secure tunnel therebetween shown as PKI loader secure tunnel protected transfer 72. For example, this secure tunnel may be established using a standard protocol, such as SSL, TLS or IPsec.

Figure 3:
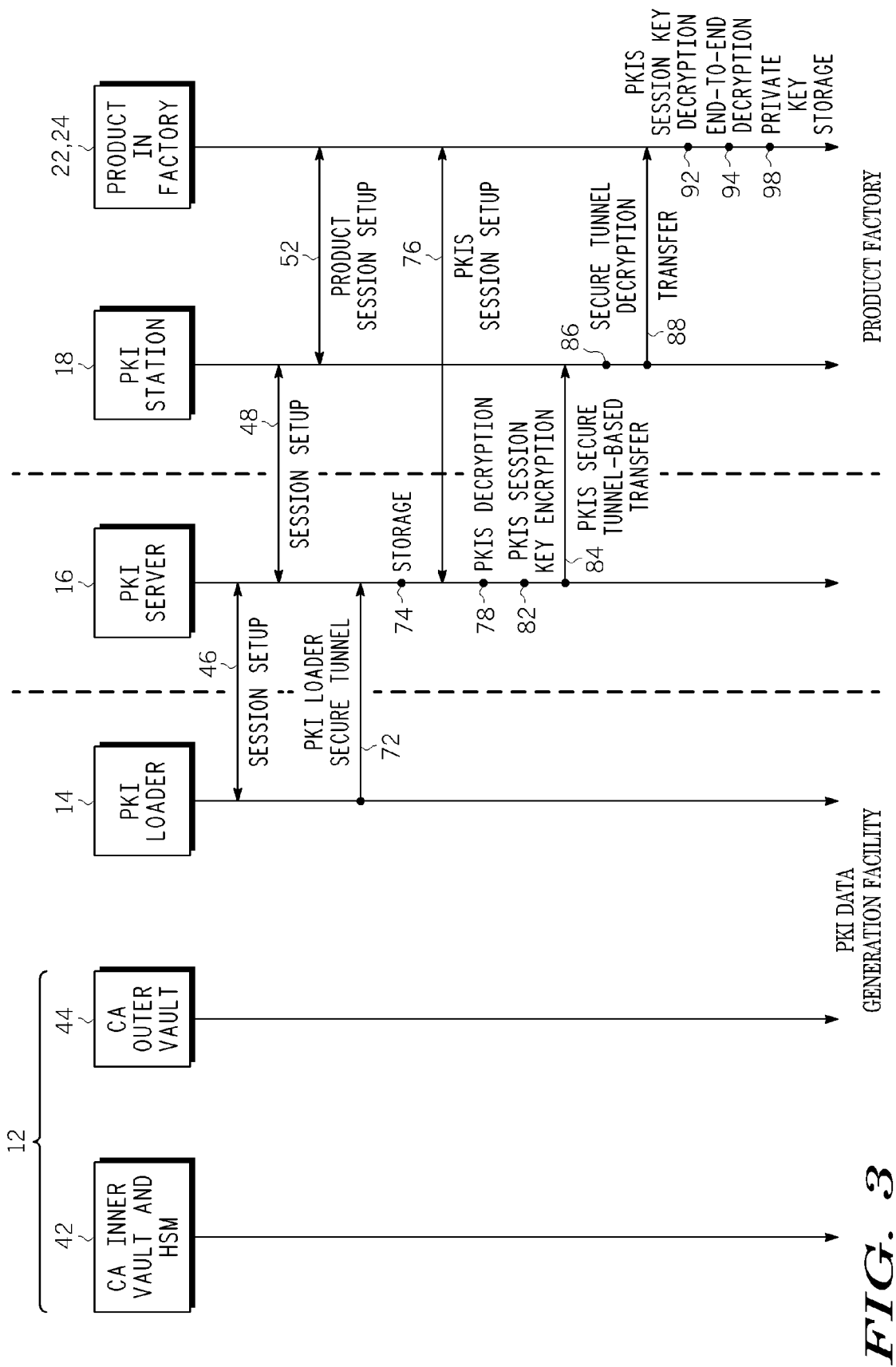
FIG. 3 is another block diagram illustrating data flow within the PKI distribution system of FIG. 1.

Referring now to FIG. 3, with continuing reference to FIG. 1 and FIG. 2, shown is another block diagram 80 continuing the illustration of the data flow within the PKI distribution system 10 from the data flow shown in FIG. 2. FIG. 3 shows the data flow generally between the PKI server (PKIS) 16 and the products 22, 24 in the product personalization facility, using one or more of the encryption layers. After the secure tunnel-protected transfer 72 of the PKIS-encrypted private key from the PKI loader 14 to the PKI server 16, the PKI server 16 stores or holds the encrypted private key in the database 36 or other appropriate location within the PKI server 16. The storage of the encrypted private key is shown generally as storage 74. It should be understood that although the database 36 is shown internal to PKI server 16, the database 36 can be external to the PKI server 16 and securely coupled thereto.

The PKI server 16 then establishes a PKIS session key using authenticated key agreement with the product of interest in the product personalization facility. Such session setup is shown generally as PKIS session setup 76. After the PKIS session is set up, the PKI server 16 performs PKIS decryption of the PKIS-encrypted private key stored therein, resulting in an end-to-end-encrypted private key. Such decryption is shown generally as PKIS decryption 78.

The PKI server 16 then encrypts the end-to-end-encrypted private key with a PKIS session key, resulting in a PKIS session key-encrypted private key. Such encryption is shown generally as PKIS session key encryption 82. After the end-to-end-encrypted private key is also PKIS session key encrypted, the PKI server 16 transfers the double-encrypted private key to the PKI station 18, e.g., over a secure tunnel therebetween. The transfer of the session key-encrypted private key over the PKIS secure tunnel is shown generally as PKIS secure tunnel-based transfer 84.

Upon receipt of the PKIS session key-encrypted private key from the PKI server 16, e.g., via a PKIS secure tunnel-based transfer, the PKI station 18 decrypts the received data using secure tunnel decryption, if necessary. The result is a PKIS session key-encrypted private key, is shown generally as secure tunnel decryption 86.

The PKIS session key-encrypted private key is transferred to or loaded on the product of interest, which is typically located in the product personalization facility. Such transfer is shown generally as transfer 88. The product then decrypts the received data using PKIS session key decryption, resulting in an end-to-end-encrypted private key. Such decryption is shown generally as PKIS session key decryption 92.

The product then decrypts the end-to-end-encrypted private key using an end-to-end decryption key, resulting in a non-encrypted private key. For example, the product decrypts a random AES key with an RSA decryption key and then uses that AES key to further decrypt the private key. Such decryption is shown generally as end-to-end decryption 96. The product then stores the non-encrypted (clear) private key. Such storage is shown generally as private key storage 98. In this manner, a private key generated in the PKI data generator 12 is securely delivered to a product or product device in a relatively non-secure product personalization facility using several layers of encryption. Preferably, in step 98, the product either stores the private key in a secure storage area of the device (e.g., secure flash) or encrypts the clear private key using a secure hardware module before writing it out to persistent storage. Optionally, the end-to-end encryption that was originally applied at the data generation facility is retained in the product persistent storage.

Figure 4:
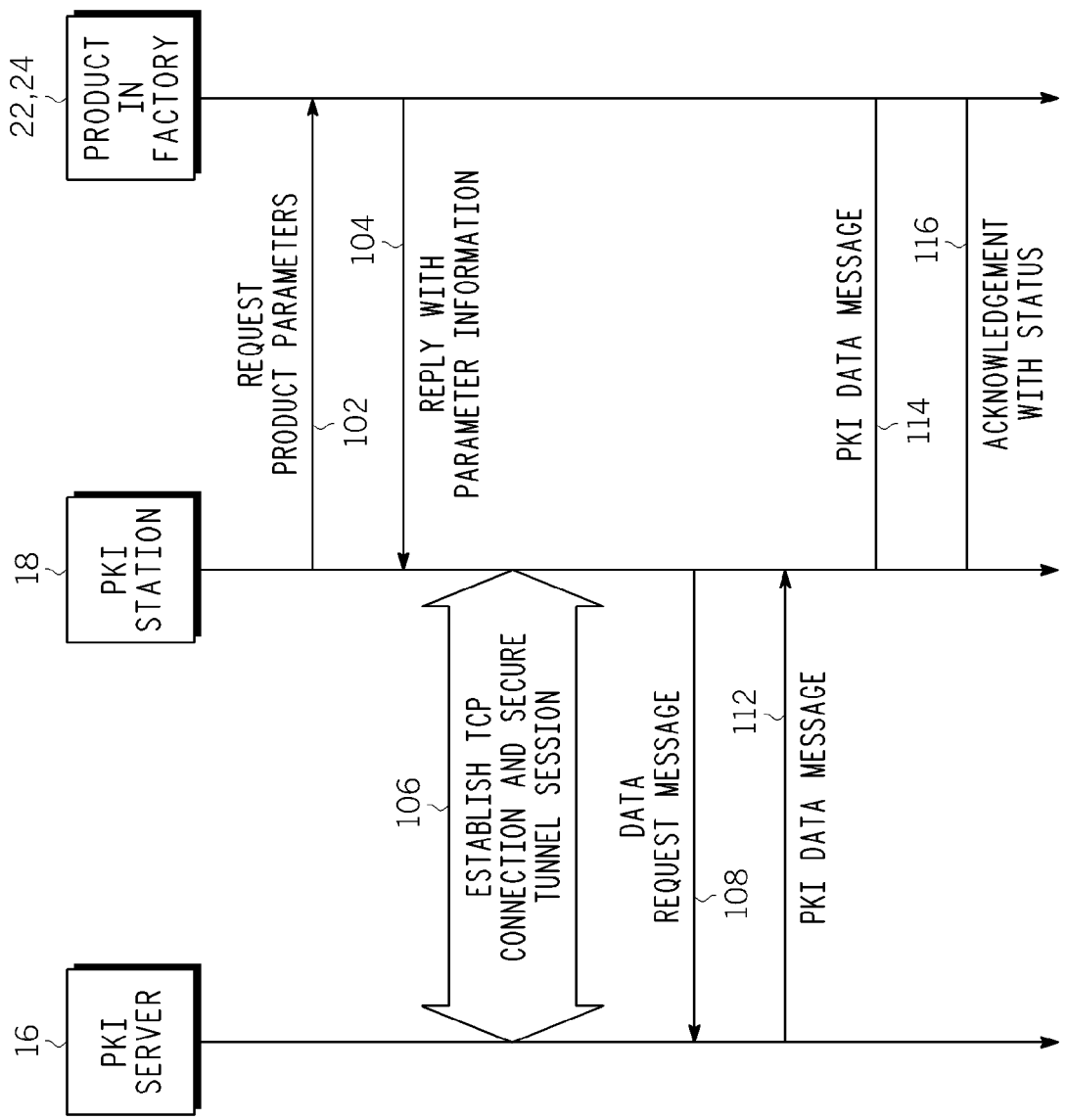
FIG. 4 is a block diagram illustrating server protocol within the PKI distribution system of FIG. 1.

Referring now to FIG. 4, with continuing reference to FIGS. 1-3, shown is a block diagram 110 illustrating at least a portion of the PKI server protocol within the PKI distribution system 10. FIG. 4 shows the server protocol generally between the PKI server 16 and one of the products of interest 22, 24 in the product personalization facility. The PKI server protocol is described hereinbelow.

The PKI server protocol (data download) process is initiated by the PKI station 18 sending an inquiry to the product 22. The inquiry requests product parameters to be included in the PKI data request message, e.g., the product key agreement public key and the product serial number. Such inquiry is shown generally as request product parameters 102. In response to the request, the product 22 calculates a random key agreement key pair, e.g., based on a set of pre-determined key agreement system parameters, and responds with the key agreement public key and product serial number, along with other appropriate information, such as the PKI data request type and the protocol version number. The response/reply includes PKI data type parameters that determine which data objects will be used for the initialization of the product. By using this information, the same protocol can be used (or re-used) for provisioning products that have different types of cryptographic keys and digital certificates. And a single product can be personalized with different types of cryptographic keys and digital certificates. Such response is shown generally as reply 104. For optimization purposes, it is possible to request multiple sets of PKI Data of the same or different type within the same PKI data request, in which case the PKI Server will later return several sets of PKI Data in the same PKI Data message in step 112.

Then, a TCP/IP or other appropriate connection and a secure tunnel are established between the PKI server 16 and the PKI station 18. Such connection and session setup are shown generally as 106. For both the TCP/IP connection and the secure tunnel setup, the PKI server 16 acts as the server and the PKI station 18 is the client. Accordingly, if the secure tunnel protocol is SSL or TLS the PKI station 18 uses a client certificate during the secure tunnel session setup.

Alternatively, as a performance enhancement, the step 106 occurs before the step 102 and before any PKI data has been requested from the PKI server. The secure tunnel then is maintained for a relatively long period of time and reused for many transactions, thus avoiding the considerable overhead of establishing this secure tunnel during the personalization of each manufactured device.

In the case that the secure tunnel is authenticated with digital certificates, the PKI server may perform additional validation on the PKI station's digital certificate—to verify that the IP address in the certificate matches the actual IP address utilized by the PKI station.

Once the connection has been established and the session has been set up, the information included in the reply 104 from the product to the PKI station 18 is forwarded by the PKI station 18 to the PKI server 16 over the secure tunnel as a data request message. Such transfer is shown generally as data request message 108.

It should be noted that the PKI station 18 is not always directly connected to the PKI server 16. In some cases, the PKI station 18 can be connected through a proxy. Therefore, in such case, instead of a direct TLS session, a first TLS session is established between the PKI server 16 and the proxy and a second TLS session is established between the proxy and the PKI station 18. In such configuration, the PKI server 16 would still directly authenticate the PKI station 18 and may not be able to obtain the identity of the PKI station 18. However, to still allow end-to-end authentication in such proxy-based scenarios, the PKI station 18 can insert additional fields into the forwarded message. For example, the PKI station 18 can insert a digital signature over this message along with its certificate. Such insertion allows the PKI station 18 to be authenticated to the PKI server 16 even when the connection therebetween is through a proxy. Also, in addition to inserting a signature and a certificate, the PKI station 18 also may insert a timestamp to prevent replay attacks. The PKI server 16 would reject any requests that have a timestamp that is too old. The PKI station 18 also may insert other appropriate information, such as the identification of the user that was logged in, e.g., as logged by the PKI server 16. The user's password also could be included, thus allowing the identity of the user to be authenticated directly to the PKI server 16.

Upon receipt of the data request message, the PKI server 16 retrieves an appropriate set of PKI data from its database 36, and generates a random key agreement key pair based on a set of pre-determined system key agreement parameters, which may differ for each type of PKI data or for each family of products. The PKI server 16 also generates a shared secret based on the PKI server key agreement private key and the product's key agreement public key that was received as part of the data request message 108. With this shared secret (called PKIS session key), the PKI server 16 encrypts the private part of that PKI data, which typically is the product private key, product-unique symmetric key, product-unique password or non-unique but secret set of cryptographic parameters. It should be noted that the private part of the PKI data already has been encrypted once using the end-to-end encryption mechanism defined during the key generation by the product. The PKI server 16 then signs the PKI data and returns the signed PKI data (or an error code in this message) to the PKI station 18 over the same secure tunnel. Such transfer is shown generally as PKI data message 112.

Typically, the PKI data already has an inner encryption layer that was added by one or more components within the PKI data generator 12. Such encryption layer (end-to-end encryption) can not be removed by the PKI server 16, since the PKI server 16 does not have the corresponding end-to-end decryption key. The PKI server 16 is completely unaware of what type of end-to-end encryption layer was added or performed. Thus, the PKI server 16 simply adds a second encryption layer based on a shared session key that is derived from the key agreement. The details of the inner (end-to-end) encryption layer may vary, since it is specific to the type of the PKI data and may also vary between different families of products. The PKI server 16 typically applies the second (PKIS session key) encryption layer to the part of the PKI data that already was covered by end-to-end encryption.

One example of the inner encryption layer would be an RSA-encrypted temporary symmetric (e.g., AES) key. RSA refers to the public key cryptography using the Rivest Shamir Adleman (RSA) algorithm. In this example, both the public and private RSA keys are treated as secret values. There can be one global RSA key pair or, alternatively, a separate key pair can be allocated for each product model or for each type of PKI data. The RSA-encrypted temporary symmetric key would be followed by the product private key, which is encrypted using the temporary symmetric key.

The RSA encrypt key is used by the PKI data generator 12 to encrypt or wrap product private keys, while the RSA decrypt key is used by the product to decrypt or unwrap the product private keys. The encrypt key is kept secret so that only an authorized facility is capable of generating this PKI data. The decrypt key also is kept secret so that only authorized products possessing this decrypt key are capable of decrypting the PKI data.

Other asymmetric key-based or symmetric key-based methods also can be used to provide the inner encryption layer. One common factor is that there is a symmetric key or asymmetric key pair shared between the PKI data generator 12 and the product 22. A different shared key or key pair may be assigned for different product models or different types of PKI data loaded into those products.

Upon receipt of the PKI data generated by the PKI server 16, the PKI station 18 is forwarded to the product 22. Such forwarding is shown generally as PKI data message 114.

After the product 22 receives the PKI data, the product 22 performs a number of validation steps. For example, the product 22 verifies that the PKI data types in the received PKI data message are the data types that were requested. Also, the product 22 validates the certificate chain of the PKI server 16 using the certificate of the PKI server root certificate authority. The PKI server root certificate authority already is present in all products before the products are personalized.

Also, the product 22 should verify that the PKI server certificate is specifically intended to sign PKI data messages and is not intended for some other purpose, e.g., a TLS certificate for the PKI server 16 or the PKI station 18 that happens to chain to the same root. Such verification can be achieved by extracting selected fields or attributes from the PKI server certificate and verifying that those fields or attributes match the profile of the PKI server certificate.

Another validation step includes the product 22 extracting the public key of the PKI server 16 from its certificate and using the public key to validate the signature field.

Once the product 22 receives the PKI data from the PKI station 18, and the PKI data message has been validated, the product 22 sends the PKI station 18 an acknowledgement and status. Such transmission is shown generally as acknowledgement with status 116.

Once the PKI data message has been validated, the product 22 performs a number of steps for each set of PKI data received thereby. Initially, the product 22 verifies the product PKI data. Typically, PKI data includes a digital certificate chain, which preferably is validated in this step. The product 22 then removes both layers of encryption from the private key data and validates the format of the decrypted private key data.

The product 22 removes the outer encryption layer by performing a number of steps. First, the product 22 calculates the DH (Diffie-Hellman) shared secret ($g^{xy}$ mod P) by taking the PKIS DH public key ($g^x$) found in the PKI data message and exponentiating it with the product key agreement private key y, i.e., ($g^x$ mod P)$^y$ mod P. Then, the product 22 converts the shared secret into a shared session key. For example, the first X bytes of the shared secret may be taken as a session key. Alternatively, the shared secret can be used as an input to a one-way function, where the output of this function is the session key. The product then decrypts the private key data using this session key. Alternatively, the DH key agreement algorithm can be replaced by Elliptic Curve Diffie-Hellman (ECDH) or other suitable public key-based key agreement algorithm where a shared session key is computed by each side by combining its private key with the public key of the other side.

Once the outer encryption layer has been removed or decrypted, the product 22 removes or decrypts the inner encryption layer. The inner layer decryption typically is specific to the particular type of PKI data involved. Conventional encryption exists for the various PKI data types.

After the product 22 has removed both encryption layers, the product 22 saves the PKI data. Typically, to satisfy robustness rules, private key data usually needs to be protected somehow inside the product storage.

During normal operation, the PKI server 16 will not re-transmit the same PKI data. Once the data message has been transmitted to the PKI station 18, the PKI server 16 will securely delete the transmitted PKI data and await the next request for data.

A test mode can be used with the PKI server 16 to make sure that the PKI server 16 can be reached and that the PKI server 16 is functioning properly. PKI data that is returned in the test mode is not intended to be used in an actual product. Such data is intended only to verify that valid certificates are returned and that the PKI data itself is properly signed. This would, in turn, indicate that the PKI server 16 is operational and has valid PKI data available in its database.

If PKI data returned in the test mode were to include private keys, the returned PKI data potentially could be loaded into actual products, even though the PKI data was not intended for such loading. Whenever a private key value is returned, the PKI server 16 updates the database 36 to make sure that the same set of PKI data is not used again, thus preventing cloning. Therefore, to avoid unnecessarily wasting PKI data in test modes, the returned values of the private keys are zeroed-out. In test mode, since private keys are not exposed in the product, the PKI Server does not record a particular set of PKI Data as "used" and will be able to re-use the same set of PKI Data later. In the test mode, the zeroed-out private key data still is decrypted using the same procedure, i.e., with a key derived form a Diffie-Hellman shared secret. However, after outer-layer decryption, the resulting value will be all zero-bytes.

Referring again to FIG. 1, the monitoring server 34 monitors the status of the PKI inventory on the PKI server 16. The monitoring server 34 triggers an alert when the PKI data nears and/or falls below a threshold level. The monitoring server 34 generates an alert message and sends the alert message to the network operations support (not shown). In response to the alert message, a secure network operations support team member transfers, e.g., manually, bulk PKI generation requests to the PKI vault within the PKI data generator 12. The monitoring server 34 also can generate an alert message when the PKI server 16 has been out of contact for a given period of time.

The system 10 also can include the ability to perform re-key and/or recertification operations. Policy and/or other factors can dictate whether the system 10 has the ability to perform re-key and/or recertification operations. Recertification verifies a product's signature generated with its private key using a corresponding product public key that is typically found in a digital certificate to confirm the identity of that product. If the product's signature or digital certificate does not validate, there is no recertification. Recertification queries can trigger appropriate investigation before allowing any new key or certification to be loaded to a product. Some recertification queries typically will be disallowed if the original certificate has been revoked (e.g., found by the PKI server to be on a revocation list). Certificate lifetimes drive both the frequency of recertification and the size of lists for revocation. In general, longer certificate lifetimes equate to fewer recertifications, but more revocation. Typically, recertification and revocation frequencies are reciprocal.

Figure 5:
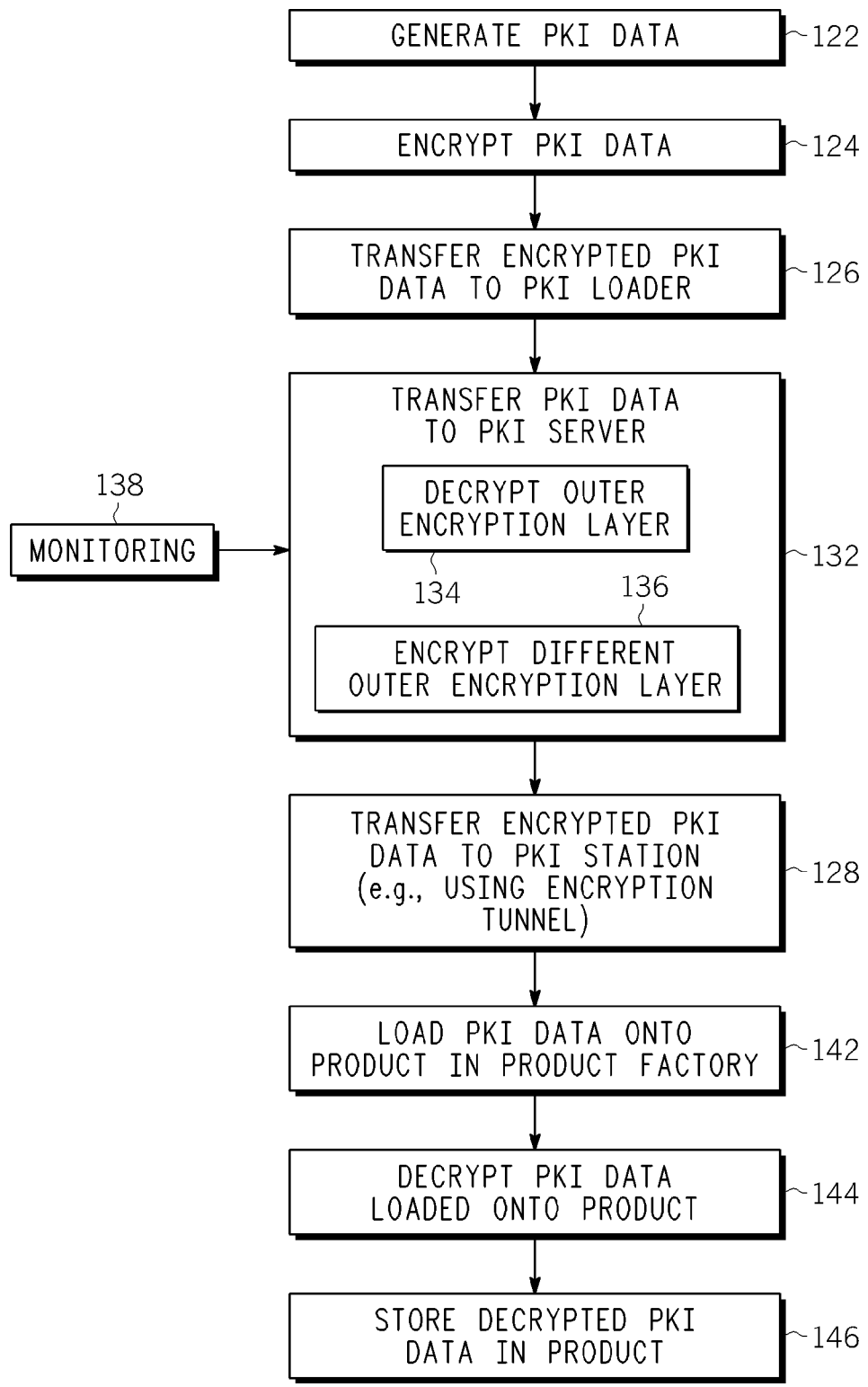
FIG. 5 is a block diagram of a method for public key distribution according to embodiments of the invention.

Referring now to FIG. 5, with continuing reference to FIGS. 1-4, shown is a block diagram of a method 120 for securely distributing PKI data from a PKI data generating facility to a product in a product personalization facility. The method 120 includes a step 122 of generating PKI data, such as a private key. As discussed hereinabove, the CA outer vault portion 44 of the PKI data generator 12 generates the private key or other appropriate PKI data.

The method 120 also includes a step 124 of encrypting the PKI data. The CA outer vault 44 transfers the generated private key with its corresponding public key to the CA inner vault 42, where it is archived. The inner vault 42 then encrypts the private key using an end-to-end key shared with the product. The end-to-end-encrypted private key is securely transferred to the outer vault 44, where the outer vault 44 encrypts the end-to-end-encrypted private key with a PKIS-specific key.

The method 120 also includes a step 126 of transferring the PKIS-encrypted private key to the PKI loader 14. As discussed hereinabove, such transfer is performed in any suitable manner, e.g., using a flash drive or other suitable transfer technique.

The method 120 also includes a step 132 of transferring the PKI data from the PKI loader 14 to the PKI server 16. The PKIS-encrypted private key is transferred from the PKI loader 14 to the PKI server 16 in an appropriate manner, e.g., using an SSL-based secure tunnel therebetween. As part of the step 132, a step 134 of the PKI server 16 decrypting the outer encryption layer of the encrypted PKI data and a step 136 of the PKI server 16 encrypting a different outer layer on the encrypted PKI data are performed.

As discussed hereinabove, after the secure tunnel-based transfer of the PKIS-encrypted private key from the PKI loader 14 to the PKI server 16, the PKI server 16 stores the encrypted private key in the database 36 or other appropriate location within the PKI server 16. The PKI server 16 then decrypts the outer layer of the PKIS-encrypted private key using PKIS decryption (step 134). The PKI server 16 then uses a key agreement protocol to establish a PKIS session key with the product of interest in the product personalization facility and encrypts the end-to-end-encrypted private key with a PKIS session key.

The method 120 also includes a step 128 of transferring the PKIS session key-encrypted PKI data to the PKI station 18. After the end-to-end-encrypted private key is PKIS session key encrypted (step 136), the PKI server 16 transfers the PKIS session key-encrypted private key to the PKI station 18, e.g., using an SSL-authenticated and encrypted secure tunnel coupled therebetween.

The method 120 also can include a monitoring step 138. The monitoring step 138 monitors the status of the PKI inventory on the PKI server 16. Using the monitoring server 34, the monitoring step 138 can trigger an alert when the PKI data nears and/or falls below a threshold level. The monitoring step 138 also can generate an alert message when the PKI server 16 has been out of contact for a given period of time.

The method 120 also includes a step 142 of loading the transferred PKI data onto the product of interest, which is located in the product personalization facility. Initially, after receiving the PKIS session key-encrypted private key from the PKI server 16, e.g., via an SSL-encrypted secure tunnel, the PKI station 18 decrypts the received PKI data using secure tunnel decryption, if necessary. The PKI station 18 then loads the PKIS session key-encrypted private key onto the product of interest. As discussed hereinabove, the loading step 142 can include one or more validation steps for validating the received PKI data.

The method 120 also includes a step 144 of the product decrypting the received PKI data. Once the PKIS session key-encrypted private key has been loaded onto the product, the product decrypts the PKIS session key-encrypted private key using decryption with the PKIS session key established through key agreement, resulting in an end-to-end-encrypted private key. The product then decrypts the end-to-end-encrypted private key using an end-to-end decryption key, resulting in a non-encrypted private key.

The method 120 also includes a step 146 of storing the PKI data. After the product decrypts the end-to-end-encrypted private key using and end-to-end decryption key, the product stores the non-encrypted (clear) private key. Thus, according to the method 120, several layers of encryption are used to securely deliver a private key or other appropriate PKI data from the PKI data generator 12 to the product in a product personalization facility that is assumed to be a relatively non-secure environment.

The methods shown in FIG. 5 may be implemented in a general, multi-purpose or single purpose processor. Such a processor will execute instructions, either at the assembly, compiled or machine-level, to perform that process. Those instructions can be written by one of ordinary skill in the art following the description of FIG. 5 and stored or transmitted on a computer readable medium. The instructions may also be created using source code or any other known computer-aided design tool. A computer readable medium may be any medium capable of carrying those instructions and includes random access memory (RAM), dynamic RAM (DRAM), flash memory, read-only memory (ROM), compact disk ROM (CD-ROM), digital video disks (DVDs), magnetic disks or tapes, optical disks or other disks, silicon memory (e.g., removable, non-removable, volatile or non-volatile), packetized or non-packetized wireline or wireless transmission signals.

It will be apparent to those skilled in the art that many changes and substitutions can be made to the PKI data distribution systems and methods herein described without departing from the spirit and scope of the invention as defined by the appended claims and their full scope of equivalents.

The invention claimed is:

1. A system for distributing public key infrastructure (PKI) data from a PKI data generating facility to at least one product in a product personalization facility, comprising:

PKI data generator hardware configured to generate PKI data for loading onto at least one product, wherein the PKI data generator hardware applies an end-to-end-encryption to at least part of the PKI data followed by a PKI Server (PKIS)-specific encryption to at least part of the PKI data; and a PKI download server coupled to the PKI data generator hardware and configured to receive PKI data transmitted from the PKI data generator hardware, wherein the PKI download server is configured to transfer encrypted PKI data to a PKI server that is coupled to the at least one product, wherein the PKI server is configured to remove the PKIS-specific encryption from the encrypted PKI data and apply a PKIS session key encryption, wherein the PKIS session key encryption uses a session key negotiated with the product through an authenticated key agreement protocol, and wherein the PKI data generator hardware is included in a PKI data generation facility and the at least one product for which the PKI data is configured for loading is located in a product personalization facility which is not part of the PKI data generation facility.

2. The system as recited in claim 1, further comprising a PKI station coupled between the PKI server and the at least one product, wherein the PKI station is configured to receive encrypted PKI data from the PKI server and transmit at least a portion of the received encrypted PKI data to the at least one product.

3. The system as recited in claim 2, wherein the PKI server is configured to establish a secure tunnel with the PKI station in such a way that the PKI server authenticates the identity of the PKI station and the PKI station authenticates the identity of the PKI server.

4. The system as recited in claim 2, wherein the PKI station is configured to transmit a PKI data request message to the PKI server, and wherein the PKI server is configured to authenticate the identity of the PKI station against an Access Control List before accepting the PKI data request message from the PKI station.

5. The system as recited in claim 4, wherein the PKI server maintains separate Access Control Lists for different types of PKI data being requested.

6. The system as recited in claim 2, wherein the PKI station is configured to bridge between a first output interface of the PKI server and a plurality of product input interfaces from at least one type of product.

7. The system as recited in claim 1, further comprising a monitoring server coupled to the PKI server, wherein the monitoring server monitors the amount of PKI data stored on the PKI server and generates an alert message when the amount of PKI data stored on the PKI server falls below a threshold level.

8. The system as recited in claim 1, wherein the PKI server includes a database for storing at least a portion of the PKI data received by the PKI server.

9. The system as recited in claim 1, wherein the PKI download server is configured to establish a secure tunnel with the PKI server in such a way that the PKI download server authenticates the identity of the PKI server and the PKI server authenticates the identity of the PKI download server.

10. The system as recited in claim 1, wherein the PKI data generator hardware includes a first portion including at least one of certificate authority inner vault and a hardware security module (HSM), and a second portion that includes a certificate authority outer vault.

11. The system as recited in claim 1, further comprising a key generation facility in a different physical location from the product personalization facility.

12. The system as recited in claim 1, wherein the PKI download server is located in the PKI data generating facility.

13. The system as recited in claim 1, wherein the PKI station is located in a product factory.

14. The system as recited in claim 1, wherein at least one of the products is selected from the group consisting of a signal converter box, a signal decoder box, a digital video recorder, a digital video disk recorder, a computer, a television, a mobile communication device, a cellular telephone, a smart telephone, a personal digital assistant (PDA), a wireless handheld device, a digital camera, a laptop personal computer (PC), a notebook PC.

15. A method for distributing PKI data from a PKI data generating facility to at least one product in a product personalization facility, comprising the steps of:

generating PKI data for loading onto at least one product;
encrypting at least a portion of the PKI data using an end-to-end encryption;
encrypting at least a portion of the PKI data using a PKI Server (PKIS)-specific encryption;
transferring at least a portion of the encrypted PKI data to a PKI loader,
wherein the PKI loader is configured to transfer encrypted PKI data to a PKI server that is coupled to the at least one product, wherein the PKI server is configured to remove the PKIS-specific encryption from the encrypted PKI data and apply a PKIS session key encryption, wherein the PKIS session key encryption uses a session key negotiated with the product through an authenticated key agreement protocol, and
wherein the step of generating PKI data is performed in a PKI data generation facility and the at least one product for which the PKI data is configured for loading is located in a product personalization facility which is not part of the PKI data generation facility.

16. The method as recited in claim 15, further comprising the step of establishing a secure tunnel between the PKI loader and the PKI server in such a way that the PKI loader authenticates the identity of the PKI server and the PKI server authenticates the identity of the PKI loader.

17. A method for distributing PKI data from a PKI data generating facility to at least one product in a product personalization facility, comprising the steps of:

transferring PKI data from a PKI server to a PKI station, wherein the PKI data is encrypted by the PKI data generating facility with an end-to-end encryption and encrypted by the PKI server with a PKIS session key encryption, wherein the PKIS session key encryption uses a session key negotiated with the product through an authenticated key agreement protocol;
loading at least a portion of the encrypted PKI data from the PKI station onto at least one product in the product personalization facility;
decrypting at least one of the end-to-end encryption and the PKIS session key encryption from the PKI data received by the at least one product; and
storing at least a portion of the decrypted PKI data on the at least one product, and
wherein the PKI data generation facility and the at least one product for which the PKI data is configured for loading is located in a product personalization facility which is not part of the PKI data generation facility.

18. The method as recited in claim 17, further comprising the step of establishing a secure tunnel between the PKI server and the PKI station in such a way that the PKI server authenticates the identity of the PKI station and the PKI station authenticates the identity of the PKI server.

19. The method as recited in claim 17, wherein the PKI station is configured to transmit a PKI data request message to the PKI server, and wherein the PKI server authenticates the identity of the PKI station against an Access Control List before accepting the PKI data request message from the PKI station.

20. The method as recited in claim 17, further comprising the step of the product performing at least one validation step for validating the authenticity of the PKI data received by the product.

\* \* \* \* \*